United States Patent
Tomita et al.

(10) Patent No.: US 9,440,225 B2
(45) Date of Patent: Sep. 13, 2016

(54) SILICON CARBIDE POROUS BODY, HONEYCOMB STRUCTURE, AND ELECTRIC HEATING TYPE CATALYST CARRIER

(71) Applicant: NGK INSULATORS, LTD., Nagoya (JP)

(72) Inventors: Takahiro Tomita, Nagoya (JP); Kiyoshi Matsushima, Nagoya (JP); Katsuhiro Inoue, Nagoya (JP); Yoshimasa Kobayashi, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 69 days.

(21) Appl. No.: 14/022,588

(22) Filed: Sep. 10, 2013

(65) Prior Publication Data
US 2014/0011667 A1   Jan. 9, 2014

Related U.S. Application Data
(63) Continuation of application No. PCT/JP2012/056563, filed on Mar. 14, 2012.

(30) Foreign Application Priority Data
Mar. 18, 2011  (JP) .................. 2011-060515

(51) Int. Cl.
*B01J 29/06* (2006.01)
*C04B 38/00* (2006.01)
(Continued)

(52) U.S. Cl.
CPC .............. *B01J 29/06* (2013.01); *C04B 35/565* (2013.01); *C04B 35/6316* (2013.01);
(Continued)

(58) Field of Classification Search
None
See application file for complete search history.

(56) References Cited

U.S. PATENT DOCUMENTS

| 7,037,477 B2 | 5/2006 | Tomita et al. |
| 2003/0053940 A1* | 3/2003 | Harada .............. B01D 39/2068 422/180 |

(Continued)

FOREIGN PATENT DOCUMENTS

| CN | 1 800 097 A | 7/2006 |
| JP | 2002-356383 A | 12/2002 |

(Continued)

OTHER PUBLICATIONS

Wei Guoping, et al., "Study of the Correlation Between Pore Structure Parameters and the Thermal Conductivity of Lightweight Bricks," Conference Proceedings of Thirteenth National Refractories Youth Symposium and the 2012 Six Provinces Metal (Mettallurgy) Institutes Refractories Symposium, Dec. 2012 (with English abstract).

(Continued)

*Primary Examiner* — Colin W Slifka
(74) *Attorney, Agent, or Firm* — Burr & Brown, PLLC

(57) ABSTRACT

A silicon carbide porous body according to the present invention contains silicon carbide particles, metallic silicon, and an oxide phase, in which the silicon carbide particles are bonded together via at least one of the metallic silicon and the oxide phase. The primary component of the oxide phase is cordierite, and the open porosity is 10% to 40%. Preferably, the silicon carbide porous body contains 50% to 80% by weight of silicon carbide, 15% to 40% by weight of metallic silicon, and 1% to 25% by weight of cordierite. Preferably, the volume resistivity is 1 to 80 Ωcm, and the thermal conductivity is 30 to 70 W/m·K.

7 Claims, 1 Drawing Sheet

(51) Int. Cl.

| | | |
|---|---|---|
| *C04B 35/565* | (2006.01) | |
| *C04B 35/63* | (2006.01) | |
| *C04B 111/00* | (2006.01) | |
| *B01J 35/00* | (2006.01) | |
| *B01J 35/04* | (2006.01) | |
| *B01D 53/94* | (2006.01) | |
| *B01J 23/38* | (2006.01) | |

(52) U.S. Cl.
CPC ........ *C04B 38/0006* (2013.01); *B01D 53/944* (2013.01); *B01J 23/38* (2013.01); *B01J 35/002* (2013.01); *B01J 35/04* (2013.01); *C04B 2111/0081* (2013.01); *C04B 2235/3481* (2013.01); *C04B 2235/428* (2013.01); *C04B 2235/5436* (2013.01); *C04B 2235/80* (2013.01)

(56) References Cited

U.S. PATENT DOCUMENTS

| | | | |
|---|---|---|---|
| 2003/0110744 A1* | 6/2003 | Gadkaree ........... | B01D 39/2068 55/523 |
| 2004/0033893 A1 | 2/2004 | Tomita et al. | |
| 2005/0158534 A1 | 7/2005 | Tabuchi et al. | |
| 2007/0033912 A1 | 2/2007 | Furukawa et al. | |
| 2010/0218473 A1 | 9/2010 | Kikuchi et al. | |
| 2011/0250094 A1* | 10/2011 | Ido ........................ | B03C 3/455 422/168 |
| 2012/0183725 A1* | 7/2012 | Noguchi et al. ............. | 428/118 |

FOREIGN PATENT DOCUMENTS

| | | |
|---|---|---|
| JP | 4307781 B2 | 8/2009 |
| JP | 4398260 B2 | 1/2010 |
| WO | 03/082770 A1 | 10/2003 |
| WO | 2005/009922 A1 | 2/2005 |
| WO | 2009/069731 A1 | 6/2009 |
| WO | WO 2011037247 A1 * | 3/2011 |

OTHER PUBLICATIONS

Chinese Office Action (Application No. 201280012338.8) dated Apr. 11, 2014.
International Search Report and Written Opinion dated Jun. 19, 2012.
U.S. Appl. No. 14/482,446, filed Sep. 10, 2014, Tomita et al.
European Search Report, European Application No. 12761331.3, dated Oct. 6, 2015 (5 pages).
Japanese Office Action, Japanese Application No. 2013-505920, dated Jan. 5, 2016 (3 pages).

* cited by examiner

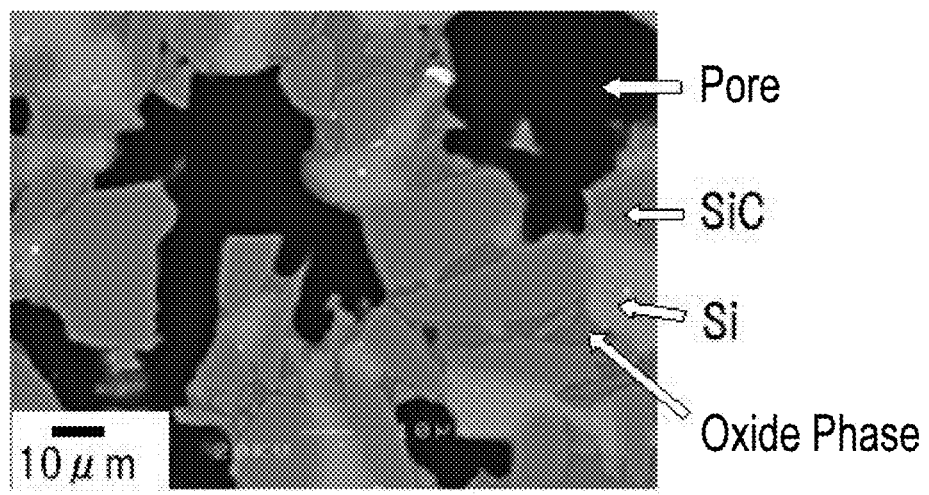

SILICON CARBIDE POROUS BODY, HONEYCOMB STRUCTURE, AND ELECTRIC HEATING TYPE CATALYST CARRIER

BACKGROUND OF THE INVENTION

1. Field of the Invention

The present invention relates to a silicon carbide porous body, a honeycomb structure, and an electric heating type catalyst carrier.

2. Description of the Related Art

Silicon carbide porous bodies in which silicon carbide particles are bonded together via metallic silicon and an oxide phase are excellent in terms of thermal shock resistance and thus used as materials for DPFs. Patent Literatures 1 and 2 disclose silicon carbide porous bodies which contain cordierite as the oxide phase. Specifically, in Example 3 of Patent Literature 1, calcium carbonate and the like are added to a mixture in which a starting material powder of SiC, Si powder, and cordierite are mixed at a mass ratio of 80:10:10, mixing and kneading are uniformly performed to obtain a puddle, the resulting puddle is formed into a honeycomb shape, and the formed body is calcined and then fired to obtain a silicon carbide porous body. This silicon carbide porous body has a porosity of 48% and a thermal conductivity of 8 W/m·K. Furthermore, in Example 2 of Patent Literature 2, a fly ash balloon, cordierite, and the like are added to a mixture in which a starting material powder of SiC and Si powder are mixed, mixing and kneading are uniformly performed to obtain a puddle, the resulting puddle is formed into a honeycomb shape, and the formed body is calcined and then fired to obtain a silicon carbide porous body. This silicon carbide porous body has a porosity of 52%.

CITATION LIST

Patent Literature

PTL 1: Japanese Patent No. 4307781
PTL 2: Japanese Patent No. 4398260

SUMMARY OF THE INVENTION

Technical Problem

In recent years, early warm-up of catalytic converters for hybrid cars has been required. As a result, there has been an increased need in particular for electric heating type catalytic converters in which the catalyst is activated early by electric heating, among the catalytic converters. In the case where a silicon carbide porous body is used as a catalyst carrier of such an electric heating type catalytic converter, the silicon carbide porous body is required to have good thermal shock resistance and electrical characteristics.

However, in the silicon carbide porous bodies containing cordierite as the oxide phase according to Patent Literatures 1 and 2, the porosity is high at about 50%, resulting in low thermal conductivity and low thermal shock resistance, which is a problem. Furthermore, such a high porosity causes an increase in electrical resistance, and therefore, heat generation due to current flow becomes insufficient, which is also a problem.

The present invention has been achieved in order to solve such problems. It is a main object of the present invention to provide a silicon carbide porous body having high thermal shock resistance and good resistance heating characteristics.

Solution to Problem

The present inventors have conducted a wide variety of studies on silicon carbide porous bodies containing silicon carbide particles, metallic silicon, and an oxide phase including cordierite, and as a result, have found that a silicon carbide porous body which contains cordierite as an oxide phase and has an open porosity within a predetermined numerical value range is excellent in terms of thermal shock resistance and resistance heating characteristics. Thereby, the present invention has been completed.

That is, a first aspect of the present invention relates to a silicon carbide porous body containing silicon carbide particles, metallic silicon, and an oxide phase, in which the silicon carbide particles are bonded together via at least one of the metallic silicon and the oxide phase. The oxide phase contains cordierite, and the silicon carbide porous body has an open porosity of 10% to 40%.

Second and third aspects of the present invention relate to a honeycomb structure and an electric heating type catalyst carrier, each including the silicon carbide porous body according to the first aspect of the present invention.

Advantageous Effects of Invention

The silicon carbide porous body according to the first aspect of the present invention has excellent thermal shock resistance and resistance heating characteristics compared with known silicon carbide porous bodies. Herein, the thermal shock resistance is determined, for example, by the presence or absence of cracks when the silicon carbide porous body is held at a predetermined high temperature and then recovered to room temperature. Furthermore, the resistance heating characteristics are determined, for example, by the achieved temperature, temperature distribution, and the like when a positive electrode and a negative electrode are attached to the silicon carbide porous body, and the silicon carbide porous body is made to generate heat by allowing a current to flow between the two electrodes. The honeycomb structure according to the second aspect of the present invention and the electric heating type catalyst carrier according to the third aspect of the present invention each use the silicon carbide porous body according to the first aspect of the present invention, and therefore they have excellent thermal shock resistance and resistance heating characteristics.

BRIEF DESCRIPTION OF DRAWINGS

FIG. 1 shows a SEM photograph of a silicon carbide porous body of Example 1.

DETAILED DESCRIPTION OF THE PREFERRED EMBODIMENTS INVENTION

A silicon carbide porous body according to the first aspect of the present invention contains silicon carbide particles, metallic silicon, and an oxide phase, in which the silicon carbide particles are bonded together via at least one of the metallic silicon and the oxide phase. The oxide phase contains, as a primary component, cordierite, and the silicon carbide porous body has an open porosity of 10% to 40%.

The silicon carbide porous body according to the first aspect of the present invention contains silicon carbide particles, metallic silicon, and an oxide phase, in which the silicon carbide particles are bonded together via at least one of the metallic silicon and the oxide phase. Furthermore, the silicon carbide porous body may contain, as a sintering aid, boron, carbon, or a metal oxide, and may contain $B_4C$ or an oxide of an alkaline earth metal or rare-earth metal. Examples of the shape of the silicon carbide porous body include a plate-like shape, a tube-like shape, a lotus root-like shape, and a honeycomb shape. In the case of the honeycomb shape, for example, the thickness of the wall may be set at 50 to 500 µm (preferably, 50 to 200 µm), and the cell density may be set at 10 to 200 cells/cm$^2$ (preferably 50 to 150 cells/cm$^2$).

In the silicon carbide porous body according to the first aspect of the present invention, the primary component of the oxide phase is cordierite $Mg_2Al_4Si_5O_{18}$. Furthermore, the silicon carbide porous body may contain, as an oxide other than cordierite contained in the oxide phase (a secondary component of the oxide phase), mullite, alumina, silica, spinel, sapphirine, a glass phase containing MgO—$Al_2O_3$—$SiO_2$, or the like. In the case where the primary component of the oxide is not cordierite, at least one of thermal shock resistance and resistance heating characteristics is degraded compared with the case where the primary component of the oxide is cordierite, which is not desirable.

The silicon carbide porous body according to the first aspect of the present invention has an open porosity of 10% to 40%. If the open porosity is lower than 10%, it becomes difficult for the silicon carbide porous body to carry a catalyst when used as a catalyst carrier, which is not desirable. If the open porosity is higher than 40%, the volume resistivity becomes excessively large, and there is a concern that heat generation may not be sufficient when a positive electrode and a negative electrode are attached to the silicon carbide porous body and a current is allowed to flow between the two electrodes even if the voltage is increased, which is not desirable. Preferably, the open porosity is 20% to 40%. In this description, the open porosity is a value calculated from the expression described below, using the total pore volume (units: cm$^3$/g) obtained by the mercury intrusion method (according to JIS R 1655) and the apparent density (units: g/cm$^3$) obtained by a dry-type automatic densitometer in accordance with the gas phase displacement method. Note that the open porosity can be adjusted, for example, by the amount of the pore-forming material used in the production of the silicon carbide porous body, the Si/SiC ratio, the amount of a sintering aid, the firing atmosphere, or the like.

Open porosity [%]=total pore volume/{(1/apparent density)+total pore volume}×100

The average pore diameter of the silicon carbide porous body according to the first aspect of the present invention is not particularly limited, but is preferably 2 to 15 µm. When the average pore diameter is less than 2 µm, it becomes difficult for the silicon carbide porous body to carry a catalyst when used as a catalyst carrier, which is not desirable. When the average pore diameter is more than 15 µm, strength is degraded, which is not desirable. In this description, the average pore diameter is a value measured in accordance with the mercury intrusion method (according to JIS R 1655).

The volume resistivity at room temperature of the silicon carbide porous body according to the first aspect of the present invention is not particularly limited, but is preferably 1 to 80 Ωcm, more preferably 10 to 60 Ωcm, and still more preferably 10 to 40 Ωcm. When the volume resistivity is less than 1 Ωcm, excess current may flow, resulting in damage to an electrical circuit or the like, which is not desirable. When the volume resistivity is more than 80 Ωcm, it is necessary to increase the voltage when a positive electrode and a negative electrode are attached to the silicon carbide porous body and a current is allowed to flow, requiring high breakdown voltages in the facilities, which is not desirable. In this description, the volume resistivity is a value measured by the four-terminal method.

The thermal conductivity of the silicon carbide porous body according to the first aspect of the present invention is not particularly limited, but is preferably 30 to 70 W/m·K. When the thermal conductivity is less than 30 W/m·K, even if heat is generated by attaching a positive electrode and a negative electrode to the silicon carbide porous body and allowing a current to flow, there is a concern that uneven temperature distribution may occur, which is not desirable. Although a higher thermal conductivity is better, because of use of a silicon carbide material, the upper limit of thermal conductivity is 70 W/m·K. In this description, the thermal conductivity is determined as the product of specific heat, thermal diffusivity, and bulk density.

The strength of the silicon carbide porous body according to the first aspect of the present invention is not particularly limited, but is preferably 20 to 70 MPa. When the strength is less than 20 MPa, thermal shock resistance is degraded, which is not desirable. Although a higher strength is better, because of use of a silicon carbide material, the upper limit of strength is 70 MPa. In this description, in the case where the silicon carbide porous body is a honeycomb structure, the strength is a value calculated from the expression described below, using the flexural strength calculated by the bending test according to JIS R1601 in which the honeycomb structure is formed into a test piece having a longitudinal direction corresponding to a direction in which the cells pass through, and the opening ratio of the honeycomb structure separately measured.

Strength=flexural strength of honeycomb structure/{1−(opening ratio/100)}

The silicon carbide porous body according to the first aspect of the present invention preferably contains 50% to 80% by weight of silicon carbide, 15% to 40% by weight of metallic silicon, and 1% to 25% by weight of cordierite, and more preferably contains 55% to 71% by weight of silicon carbide, 19% to 36% by weight of metallic silicon, and 3% to 23% by weight of cordierite. Thereby, the thermal shock resistance and resistance heating characteristics are further improved.

The silicon carbide porous body according to the first aspect of the present invention preferably has a structure in which silicon carbide particles are bonded together via metallic silicon. Furthermore, the metallic silicon is preferably covered with an oxide phase. Thereby, the thermal shock resistance and resistance heating characteristics are more likely to be improved. Moreover, in the case where the metallic silicon is covered with the oxide phase, the thickness of the oxide phase layer is preferably 0.1 to 10 µm.

The silicon carbide porous body according to the first aspect of the present invention can be used in a honeycomb structure. The honeycomb structure can be used as a catalytic converter on which, for example, a noble metal catalyst is carried. That is, one utilization form of the honeycomb structure is a catalyst carrier. Furthermore, in catalytic converters of an electric heating type, high thermal shock resistance is required, and therefore use of the silicon carbide porous body according to the first aspect of the present invention is particularly preferable.

A method for producing a silicon carbide porous body according to the first aspect of the present invention will be described below, taking as an example a case where the silicon carbide porous body is a honeycomb structure.

First, silicon carbide powder, metallic silicon powder, and cordierite powder are mixed and, as necessary, a binder, a surfactant, a pore-forming material, water, and the like are added thereto to produce a forming material. Preferably, the mass of the metallic silicon powder is about 20% to 40% by mass relative to the total mass of the silicon carbide powder and the metallic silicon powder. The average particle size of the silicon carbide particles is preferably 5 to 100 µm, and more preferably 20 to 40 µm. The average particle size of the metallic silicon particles is preferably 0.1 to 20 µm, and more preferably 1 to 10 µm. The average particle size of the cordierite particles is preferably 0.1 to 50 µm, and more preferably 1 to 10 µm. The average particle sizes are values measured by laser diffractometry. In addition, instead of cordierite powder, starting materials that form cordierite by reaction during firing may be used. In that case, for example, a Mg source, an Al source, and a Si source may be used so as to constitute the composition of cordierite. Specifically, talc ($3MgO.4SiO_2.H_2O$), kaolin ($2SiO_2.Al_2O_3.2H_2O$), alumina, aluminum hydroxide, silica, and the like may be used so as to constitute the composition of cordierite. However, use of cordierite powder is preferable rather than use of starting materials that form cordierite by reaction during firing.

Examples of the binder include methylcellulose, hydroxypropoxylcellulose, hydroxyethylcellulose, carboxymethylcellulose, and polyvinyl alcohol. Among them, combined use of methylcellulose and hydroxypropoxylcellulose is preferable. The content of the binder is preferably 2% to 10% by mass relative to the total forming material.

As the surfactant, ethylene glycol, dextrin, a fatty acid soap, a polyalcohol, or the like can be used. These may be used alone or in combination of two or more. The content of the surfactant is preferably 2% by mass or less relative to the total forming material.

The pore-forming material is not particularly limited as long as it forms pores after firing. Examples thereof include graphite, starch, an expandable resin, a water-absorbing resin, and silica gel. The content of the pore-forming material is preferably 10% by mass or less relative to the total forming material. The average particle size of the pore-forming material is preferably 10 to 30 µm. When the particle size is less than 10 µm, pores may not be formed sufficiently in some cases. When the particle size is more than 30 µm, a die head may become blocked during forming in some cases. The average particle size of the pore-forming material is a value measured by laser diffractometry.

The water content is appropriately adjusted so that the puddle has hardness that facilitates forming, and is preferably 20% to 60% by mass relative to the total forming material.

Next, the forming material is kneaded to form a puddle. The method for kneading the forming material to form a puddle is not particularly limited. Examples thereof include a method in which a kneader, vacuum pug mill, or the like is used.

Next, the puddle is subjected to extrusion to form a honeycomb formed body. In the extrusion, a die head having a desired overall shape, cell shape, wall thickness, cell density, and the like is preferably used. As the material for the die head, a cemented carbide that is hard to wear is preferable. The honeycomb formed body has a structure including porous walls which partition a plurality of cells serving as flow channels for fluid and an outer wall located on the outermost circumference. The thickness of the walls, the cell density, the thickness of the outer wall, and the like can be appropriately determined, in consideration of contraction during drying and firing, so as to conform to the constitution of the intended honeycomb structure. The honeycomb formed body thus obtained is preferably dried before being fired. The drying method is not particularly limited. Examples thereof include an electromagnetic wave heating method, such as drying by microwave heating or drying by high-frequency dielectric heating, and an external heating method, such as hot air drying or superheated steam drying. Among these, from the viewpoint that the entire formed body can be dried quickly and uniformly so as not to cause cracks, preferably, after a certain amount of moisture is dried by an electromagnetic wave heating method, the remaining moisture is dried by an external heating method. Regarding drying conditions, preferably, after 30% to 99% by mass of moisture, relative to the moisture content before drying, is removed by an electromagnetic wave heating method, 3% by mass or less of moisture is achieved by an external heating method. As the electromagnetic wave heating method, drying by dielectric heating is preferable. As the external heating method, hot air drying is preferable.

In the case where the length in the central axis direction of the honeycomb formed body is not a desired length, it is preferable to cut the honeycomb formed body at both end faces (both ends) to achieve the desired length. Although the cutting method is not particularly limited, examples thereof include a method using a circular saw cutter.

Next, the honeycomb formed body is fired to produce a honeycomb structure. Before firing, it is preferable to perform calcination in order to remove the binder and the like. The calcination is preferably performed in the atmosphere at 200° C. to 600° C. for 0.5 to 20 hours. In the firing process, heating is preferably performed in an inert atmosphere, such as nitrogen or argon, (under an oxygen partial pressure of $10^{-4}$ atm or less) at 1,300° C. to 1,600° C. at normal pressure for 1 to 20 hours. Furthermore, after the firing, in order to improve durability, it is preferable to carry out oxidation treatment in the air (which may contain water vapor) at 1,100° C. to 1,400° C. for 1 to 20 hours. The calcination and firing can be performed, for example, using an electric furnace, gas furnace, or the like.

The silicon carbide porous body according to the first aspect of the present invention can be used in a honeycomb structure. The honeycomb structure is used as a DPF or catalytic converter on which, for example, a noble metal catalyst is carried. That is, one utilization form of the honeycomb structure is a catalyst carrier. Furthermore, in catalytic converters of an electric heating type, high thermal shock resistance is required, and therefore use of the silicon carbide porous body according to the first aspect of the present invention is particularly preferable.

EXAMPLES

Example 1

Silicon carbide (SiC) powder, metallic silicon (Si) powder, and cordierite particles were mixed at a mass ratio of 64:28:8. Hydroxypropyl methylcellulose serving as a binder and a water-absorbing resin serving as a pore-forming material were added to the resulting mixture, and water was also added thereto to prepare a forming material. The forming material was kneaded and pugged to form a cylindrical puddle. The content of the binder was 7% by mass relative to the total of the SiC powder and the Si powder. The content of the pore-forming material was 2% by mass relative to the total of the SiC powder and the Si powder. The water content was 35% by mass relative to the total of the SiC powder and the Si powder. The average particle size of the SiC powder was 30 μm, and the average particle size of the Si powder was 6 μm. Furthermore, the average particle size of the pore-forming material was 20 μm. Note that the average particle sizes of the SiC particles, the Si particles, and the pore-forming material are values measured by laser diffractometry.

The resulting cylindrical puddle was formed into a honeycomb shape using an extruder, and thereby a honeycomb formed body was obtained. The resulting honeycomb formed body was dried by dielectric heating, and then dried at 120° C. for 2 hours using a hot air drying machine. Thereby, a dried honeycomb body was obtained.

The dried honeycomb body was degreased in the atmosphere at 450° C. over 3 hours, then fired at about 1,450° C. for 2 hours in an Ar inert atmosphere (under an oxygen partial pressure of $10^{-4}$ atm or less), and further subjected to oxidation treatment at 1,200° C. for 4 hours. Thereby, a silicon carbide porous body having a honeycomb structure was obtained.

In this honeycomb structure, the wall thickness was 90 and the cell density was 90 cells/cm$^2$. The honeycomb structure had a circular bottom face with a diameter of 93 mm, and the length in the direction in which the cells of the honeycomb structure extended was 100 mm. FIG. 1 shows a SEM photograph of a cross section of this honeycomb structure.

The resulting silicon carbide porous body having the honeycomb structure had an open porosity of 34%, a strength of 42 MPa, an average pore diameter of 11 μm, a thermal conductivity of 43 W/m·K, an average linear thermal expansion coefficient of $4.3 \times 10^{-6} K^{-1}$, and a volume resistivity of 36 Ωcm. Furthermore, in an electric heating test in which uniformity in the temperature distribution associated with heat generation when current was applied was evaluated, One silicon carbide porous body was evaluated to be "○" (good), showing low nonuniformity in the temperature distribution. In an electric furnace spalling test in which thermal shock resistance was evaluated, the silicon carbide porous body was evaluated to be "○", showing high thermal shock resistance. The results are summarized in Table 1.

The parameters were measured as described below.

Composition

The composition of the silicon carbide porous body having the honeycomb structure was measured by powder X-ray diffraction using the internal reference method. Note that the difference between the composition ratio of the starting material and the composition ratio of the silicon carbide porous body was about 1%.

Open Porosity

The open porosity was calculated from the expression described below, using the total pore volume [cm$^3$/g] obtained by the mercury intrusion method (according to JIS R 1655) and the apparent density [g/cm$^3$] obtained by a dry-type automatic densitometer in accordance with the gas phase displacement method.

Open porosity [%]=total pore volume/{(1/apparent density)+total pore volume}×100

Average Pore Diameter

The average pore diameter was measured in accordance with the mercury intrusion method (according to JIS R 1655).

Strength

The strength was calculated from the expression described below, using the flexural strength calculated by the bending test according to JIS R1601 in which the honeycomb structure was formed into a test piece (5 cells×10 cells×40 mm in length) having a longitudinal direction corresponding to a direction in which the cells pass through, and the opening ratio of the honeycomb separately measured.

Strength=flexural strength of honeycomb structure/{1−(opening ratio/100)}

Thermal Conductivity

The thermal conductivity was calculated as the product of specific heat, thermal diffusivity, and bulk density. The specific heat was measured by the DSC method, and the thermal diffusivity was measured by the AC calorimetric method. The bulk density was calculated from the following expression:

Bulk density=1/{1/apparent density}+total pore volume}

Average Linear Thermal Expansion Coefficient

The average linear thermal expansion coefficient from room temperature to 800° C. was measured in accordance with JIS R1618.

Volume Resistivity

The volume resistivity was measured at room temperature by the four-terminal method.

Electric Heating Test

A plate-like formed body was produced separately using a starting material having the same composition as that of Example 1, and the formed body was subjected to the drying, degreasing, firing, and oxidation treatment described above to obtain a plate-like fired body. A test piece (30 mm in length×40 mm in width×0.3 mm in thickness) was cut out from the fired body. Using vertices of a long side of the test piece as electrodes, current was applied while gradually increasing the voltage from 1 to 500 V, and a change in temperature distribution of the test piece with time was measured by thermography. At the time point when the temperature at the middle point between the electrodes reached 200° C., the difference between the temperature of the center of the test piece and the temperature (200° C.) at the middle point between the electrodes was defined as ΔT. When ΔT was lower than 80° C., the test piece was evaluated to be "⊙". When ΔT was 80° C. or higher and lower than 120° C., the test piece was evaluated to be "○". When ΔT was higher than 120° C., the test piece was evaluated to be "Δ". That is, "⊙", "○", and "Δ" are indicators indicating uniformity in the temperature distribution of the test piece. "⊙" and "○" show that the temperature distribution was relatively uniform, and "Δ" shows that the temperature distribution was nonuniform. Furthermore, "x" shows that current did not flow because the resistance was too high. In Comparative Examples 2 and 4 having high volume resistivity, even when the voltage was increased, current did not easily flow. When the voltage reached a high level, current flowed at once and the temperature at the middle point between the electrodes rapidly increased. However, since conduction of heat to the center of the test piece was slow at that moment, ΔT increased.

Electric Furnace Spalling Test (Rapid Cooling Test)

A honeycomb structure was heated in an electric furnace at a predetermined temperature for 2 hours, and the temperature was made uniform. Then, the honeycomb structure was recovered to room temperature, and the presence or absence of occurrence of cracks was visually observed. The honeycomb structure in which cracks did not occur when the predetermined temperature was set at 650° C. was evaluated to be "⊙". The honeycomb structure in which cracks occurred when the temperature was set at 650° C. was evaluated to be "Δ". The honeycomb structure in which cracks occurred at a temperature lower than 650° C. was evaluated to be "x". The higher the temperature at which cracks occur, the higher the thermal shock resistance.

Examples 2 to 17 and Comparative Examples 1 to 5

In Examples 2 to 17 and Comparative Examples 1 to 5, silicon carbide porous bodies were produced as in Example 1 except that the composition was set as shown in Table 1, and the amount of the pore-forming material and the average particle size of the starting material were finely adjusted. The results of measurement of the compositions of the silicon carbide porous bodies showed that the oxide phase was cordierite in Examples 1 to 17. However, very small amount of different phases (mullite, cristobalite, spinel, sapphirine, and the like) were also present. In Comparative Examples 1 to 3, the primary component of the oxide phase which did not contain cordierite was SrO—SiO$_2$.

As is evident from Table 1, regarding the electric heating test, each of Examples 1 to 17 was evaluated to be "⊙" or "○", while each of Comparative Examples 1 to 5 was evaluated to be "Δ" or "x". Furthermore, regarding the electric furnace spalling test, each of Examples 1 to 17, excluding Example 11, was evaluated to be "○", while each of Comparative Examples 1 to 5 was evaluated to be "Δ" or "x". This shows that the silicon carbide porous bodies of Examples 1 to 17 are excellent in terms of thermal shock resistance and resistance heating characteristics compared with the silicon carbide porous bodies of Comparative Examples 1 to 5. Consideration will be given below to such test results. Examples 1 to 17 satisfy the two conditions that the oxide phase is the cordierite phase and the open porosity is 10% to 40%. In contrast, Comparative Examples 2 to 5 satisfy neither of the two conditions, and Comparative Example 1 satisfies only the condition that the open porosity is 10% to 40%. Therefore, it is believed that good test results were obtained in Examples 1 to 17, while good test results were not obtained in Comparative Examples 1 to 5. Furthermore, in Examples 1 to 17, the thermal conductivity is in the range of 30 to 70 W/m·K, and the volume resistivity is in the range of 1 to 50 Ωcm. In contrast, in Comparative Examples 1 to 5, at least one of the thermal conductivity and the volume resistivity is out of the range. This is also considered to be a factor in good test results in Examples 1 to 17 and not good test results in Comparative Examples 1 to 5.

Furthermore, when Comparative Example 1 having the cordierite phase is compared to Comparative Example 4 having the oxide phase containing, as a primary component, SrO—SiO$_2$, the thermal conductivity of Comparative Example 4 is higher than that of Comparative Example 1 in spite of the fact that the open porosity of Comparative Example 4 is higher than that of Comparative Example 1. This shows that cordierite is effective in increasing thermal conductivity compared with SrO—SiO$_2$.

TABLE 1

| | Composition of Silicon Carbide Porous Body | | | | Properties of Silicon Carbide Porous Body | | | | | | | |
|---|---|---|---|---|---|---|---|---|---|---|---|---|
| | Silicon Carbide (wt %) | Metallic Silicon (wt %) | Cordierite (wt %) | Oxide Not Containing Cordierite (wt %) | Open Porosity (%) | Strength (MPa) | Average Pore Diameter (μm) | Thermal Conductivity (W/mK) | Average Linear Thermal Expansion Coefficient (ppm/K) | Volume Resistivity (Ωcm) | Electric Heating Test | Electric Furnace Spalling Test |
| Example 1 | 64 | 27 | 9 | 0 | 34 | 42 | 11 | 43 | 4.3 | 36 | ○ | ○ |
| Example 2 | 64 | 27 | 9 | 0 | 34 | 56 | 10 | 44 | 4.1 | 38 | ○ | ○ |
| Example 3 | 60 | 31 | 9 | 0 | 32 | 49 | 10 | 50 | 4.2 | 30 | ○ | ○ |
| Example 4 | 55 | 36 | 9 | 0 | 28 | 54 | 8 | 63 | 4.2 | 28 | ⊙ | ○ |
| Example 5 | 65 | 27 | 8 | 0 | 36 | 41 | 11 | 45 | 4.1 | 15 | ○ | ○ |
| Example 6 | 64 | 26 | 10 | 0 | 36 | 47 | 11 | 46 | 4.2 | 14 | ○ | ○ |
| Example 7 | 55 | 32 | 13 | 0 | 22 | 62 | 5 | 60 | 4.3 | 14 | ⊙ | ○ |
| Example 8 | 55 | 22 | 23 | 0 | 20 | 63 | 2 | 49 | 4.2 | 26 | ○ | ○ |
| Example 9 | 64 | 25 | 11 | 0 | 34 | 49 | 10 | 38 | 4.2 | 16 | ○ | ○ |
| Example 10 | 69 | 22 | 9 | 0 | 39 | 30 | 13 | 36 | 4.6 | 18 | ○ | ○ |
| Example 11 | 71 | 19 | 10 | 0 | 40 | 35 | 14 | 33 | 4.6 | 15 | ○ | Δ |
| Example 12 | 56 | 37 | 7 | 0 | 31 | 32 | 10 | 50 | 4.6 | 11 | ○ | ○ |
| Example 13 | 61 | 32 | 7 | 0 | 33 | 33 | 12 | 43 | 4.5 | 11 | ○ | ○ |
| Example 14 | 56 | 21 | 23 | 0 | 38 | 39 | 9 | 38 | 4.2 | 76 | ○ | ○ |
| Example 15 | 64 | 22 | 14 | 0 | 33 | 48 | 10 | 31 | 4.3 | 21 | ○ | ○ |
| Example 16 | 63 | 34 | 3 | 0 | 39 | 34 | 11 | 41 | 4.5 | 13 | ○ | ○ |
| Example 17 | 61 | 33 | 6 | 0 | 33 | 36 | 10 | 43 | 4.5 | 14 | ○ | ○ |
| Comparative Example 1 | 68 | 29 | 0 | 3 | 38 | 33 | 12 | 29 | 4.8 | 31 | Δ | X |
| Comparative Example 2 | 68 | 29 | 0 | 3 | 42 | 28 | 15 | 33 | 4.8 | 600 | Δ | X |
| Comparative Example 3 | 78 | 20 | 0 | 2 | 52 | 21 | 23 | 18 | 4.8 | $1 \times 10^6$ | X | X |
| Comparative Example 4 | 68 | 29 | 3 | 0 | 45 | 22 | 15 | 33 | 4.6 | 800 | Δ | Δ |
| Comparative Example 5 | 78 | 20 | 2 | 0 | 53 | 17 | 22 | 22 | 4.7 | $1 \times 10^6$ | X | X |

This application claims the benefit of Japanese Patent Application No. 2011-060515, filed on Mar. 18, 2011, which is hereby incorporated by reference herein in its entirety.

INDUSTRIAL APPLICABILITY

The silicon carbide porous body according to the first aspect of the present invention can be used in a honeycomb structure. The honeycomb structure can be used as a catalytic converter on which, for example, a noble metal catalyst is carried. That is, one utilization form of the honeycomb structure is a catalyst carrier. In particular, in a catalyst carrier for a catalytic converter of an electric heating type, high thermal shock resistance is required, and therefore use of the silicon carbide porous body according to the first aspect of the present invention is particularly preferable.

What is claimed is:

1. A silicon carbide porous body comprising silicon carbide particles, metallic silicon, and an oxide phase, the silicon carbide particles being bonded together via at least one of the metallic silicon and the oxide phase,
wherein the oxide phase contains, as a primary component, cordierite, and the silicon carbide porous body has an open porosity of 10% to 40%, and 100% by weight of the silicon carbide porous body contains 50% to 80% by weight of silicon carbide, 15% to 40% by weight of metallic silicon, 1% to 25% by weight of cordierite, and unavoidable impurities.

2. The silicon carbide porous body according to claim 1, wherein the silicon carbide porous body has a volume resistivity at room temperature of 1 to 80 $\Omega$cm and a thermal conductivity of 30 to 70 W/m·K.

3. The silicon carbide porous body according to claim 1, wherein the metallic silicon is covered with the oxide phase.

4. A honeycomb structure comprising the silicon carbide porous body according to claim 1.

5. An electric heating type catalyst carrier using the silicon carbide porous body according to claim 1.

6. The silicon carbide porous body according to claim 1, wherein the silicon carbide porous body contains 55% to 71% by weight of silicon carbide, 19% to 37% by weight of metallic silicon, and 3% to 23% by weight of cordierite.

7. The silicon carbide porous body according to claim 1, wherein the silicon carbide porous body has an open porosity of 10% to 39%.

* * * * *